3,300,517
HALOMETHYL PREGNENES
Riccardo Villotti and Albert Bowers, both of Mexico City, Mexico, assignors to Syntex Corporation, a corporation of Panama
No Drawing. Filed Apr. 13, 1962, Ser. No. 187,224
12 Claims. (Cl. 260—397.3)

The present invention relates to certain new cyclopentanophenanthrene derivatives and to the method for the production thereof.

More particularly it relates to the novel 16α-chloromethyl, bromomethyl and iodomethyl derivatives of the pregnene series, substituted at C–3 by a keto group or halogen as well as to the 16α-halomethyl-Δ$^{3,5}$-pregnadienes.

These compounds are represented by the following formulas:

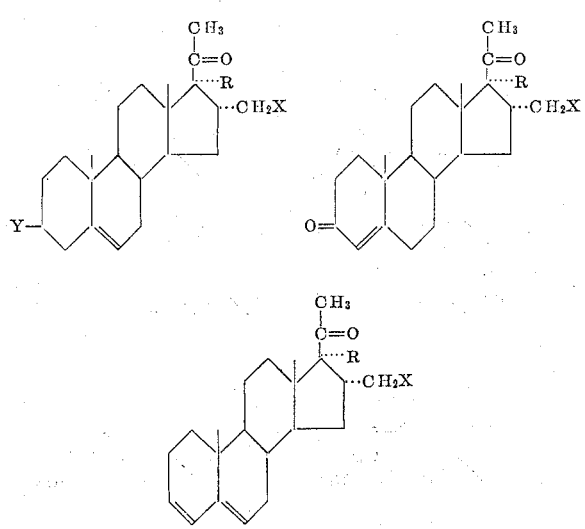

In the above formulas, R represnts hydrogen, hydroxy or an acyloxy group of less than 12 carbon atoms; X represents chlorine, bromine or iodine and Y represents fluorine, chlorine or bromine.

The acyl groups above referred to are derived from hydrocarbon carboxylic acids of less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds object of the present invention are progestational agents having anti-estrogenic, anti-androgenic, and anti-ovulatory activities. They are also hypnotic agents, useful in the treatment of premenstrual tension and possess anti-fungal and anti-bacterial properties.

The novel 16α-halomethyl-progesterone derivatives as well as the 16α-halomethyl-3β-chloro, fluoro and bromo Δ$^5$-pregnene compounds and 16α-halomethyl-Δ$^{3,5}$-pregnadiene derivatives unsubstituted at C–17α, are obtained by the method illustrated by the following sequence of reactions:

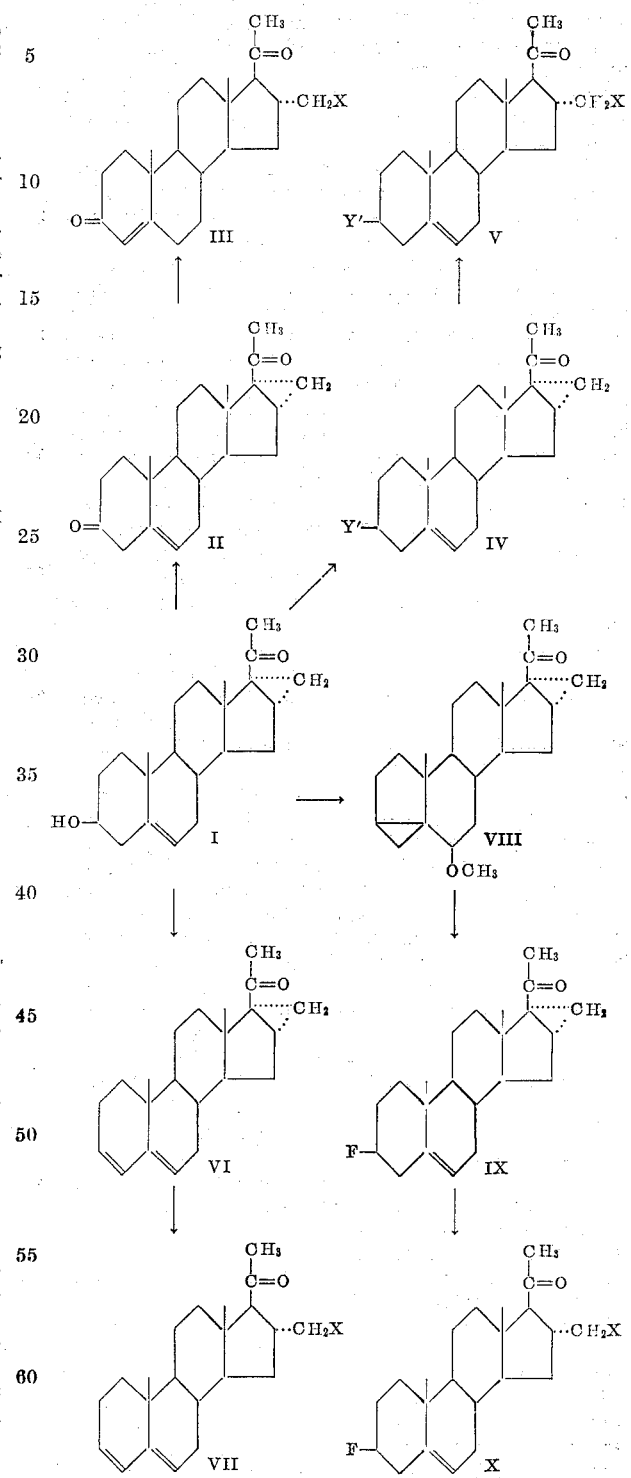

In the above formulas, X has the same meaning as heretofore set forth and Y$^1$ represents chlorine or bromine.

In practicing the process set forth above, 16α,17α-cyclomethylene-Δ5-pregnen-3β-ol-20-one (I), obtained from 16α,17α(4'-3c-pyrazolo)-Δ5-pregnen-3β-ol-20-one acetate in accordance with the method of G. Nominé et al. in Bull. Soc. Chim., France, p. 550 (1960), followed by conventional saponification of the acetoxy group at C–3, is oxidized with an 8 N chromic acid solution in acetone. The resulting crude 3-keto compound (II) dissolved in an inert organic solvent, preferably tetrahydrofuran, is treated at low temperature between 0 and 5° C. with a mixture of boron-trifluoride etherate and concentrated hydrochloric acid. The resulting mixture is kept at room temperature for a prolonged period of time in the order of 2 to 5 days to produce 16α-chloromethyl-progesterone (III; X=Cl); under the conditions employed in the reaction, the Δ5-double bond is shifted to give the Δ4-3-keto compound.

When aqueous solutions of hydrogen bromide and hydrogen iodide are used instead of concentrated hydrochloric acid, there are produced 16α-bromomethyl and 16α-iodomethyl-progesterone (III; X=Br, I).

Upon treatment of 16α,17α-cyclomethylene-Δ5-pregnen-3β-ol-20-one (I) with phosphorous pentachloride or phosphorous pentabromide in an inert organic solvent, preferably in benzene solution, there is substituted for the 3-hydroxy group, a bromine or chlorine atom (IV). The reaction of these intermediates with hydrochloric, hydrobromic or hydroiodic acid in the presence of boron trifluoride and using tetrahydrofuran as solvent, affords the 16α-halomethyl-3β-chloro and 3β-bromo-Δ5-pregnene compounds (V). Thus for example, treatment of 16α,17α-cyclomethylene-Δ5-pregnen-3β-ol-20-one with phosphorous pentachloride in benzene solution gives 16α,17α-cyclomethylene-3β-chloro-Δ5-pregnen-20-one, which upon reaction with hydrochloric acid in the presence of boron trifluoride produces 3β-chloro-16α-chloromethyl-Δ5-pregnen-20-one.

The 16α-halomethyl-3β-fluoro-Δ5-pregnenes (X) are obtained by converting the cyclomethylene compound (I) into its 3-tosylate by conventional esterification with tosyl chloride in pyridine solution; treatment of this tosylate with potassium acetate in methanol solution gives 16α,17α - cyclomethylene - 3,5 - cyclo-6β - methoxy-pregnan-20-one (VIII) which upon reaction with aqueous hydrofluoric acid in benzene solution at room temperature or with anhydrous hydrogen fluoride in methylene chloride-tetrahydrofuran at low temperature, preferably between 0 and —80° C., for a period of time in the order of 18 to 30 hours, produces the 3β-fluoro-16α,17α-cyclomethylene-Δ5-pregnene (IX). By reaction of the latter compound with hydrochloric, hydrobromic or hydroiodic acid in mixture with boron trifluoride, as described previously, there are produced the corresponding 16α-halomethyl-3β-fluoro-pregnenes, i.e., 3β-fluoro-16α - chloromethyl - Δ5 - pregnen-20-one, 3β-fluoro-16α-bromomethyl-Δ5-pregnen-20-one and 3β-fluoro-16α-iodomethyl-Δ5-pregnen-20-one (X).

Treatment of the 3-tosylate of I with lithium chloride in an aliphatic amide, preferably using dimethylacetamide as solvent, at reflux temperature for several hours, preferably during 5 hours, produces 16α,17α-cyclomethylene-Δ3,5-pregnadien-20-one (VI). Upon reaction of this compound with hydrochloric, hydrobromic or hydroiodic acid in mixture with boron trifluoride, under the same conditions previously described, there are produced 16α-chloromethyl-Δ3,5-pregnadien-20-one, 16α-bromomethyl-Δ3,5-pregnadien-20-one and 16α-iodomethyl-Δ3,5-pregnadien-20-one respectively (VII).

It is obvious that our method can be modified within wide limits. Thus for example the 16α-halomethyl group can be introduced prior to the substitution of the 3-hydroxy for a halogen atom or the oxidation of the 3-hydroxy-Δ5-compound to the Δ4-3-keto derivatives, and this oxidation may also be effected under different conditions.

The 16α-halomethyl-17α-hydroxy (acyloxy) compounds of the present invention are obtained by the methods illustrated by the following series of reactions:

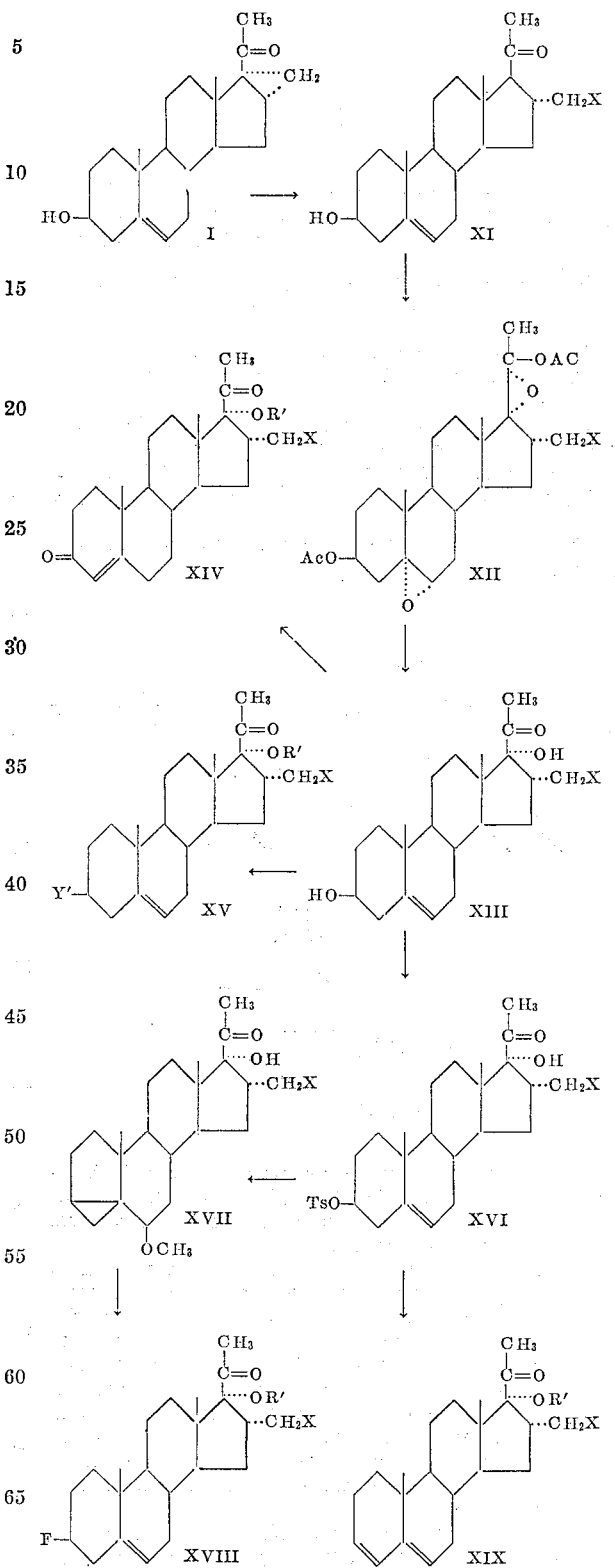

In the above formulas, X and Y1 have the same meaning as heretofore set forth and R1 represents hydrogen or an acyl group of less than 12 carbon atoms.

In practicing the process set forth above, 16α,17α-cyclomethylene-Δ5-pregnen-3β-ol-20-one is treated with hydrochloric, hydrobromic or hydriodic acid in mixture with boron trifluoride in an inert organic solvent, preferably using tetrahydrofuran, to give the corresponding 16α-halomethyl derivatives (XI). By reaction of these compounds with acetic anhydride in the presence of p-toluenesulfonic acid, there are produced the 16α-halomethyl derivatives of $\Delta^{5,17(20)}$-pregnadiene-3β,20-diol diacetate which upon treatment with an organic peracid, preferably perbenzoic acid, there are produced the 5α,6α;17α,20α-bis-oxido compounds (XII).

By reaction of the bis-oxido-16α-halomethyl compounds with dilute base, preferably using 2% methanolic potassium hydroxide solution at room temperature, the 17,20-epoxide ring is opened with simultaneous saponification at C-3. The 5α,6α-oxido is then eliminated under Cornforth conditions, that is, by treatment with sodium iodide, sodium acetate and zinc dust in acetic acid, thus producing the 16α-chloro-, bromo, and iodomethyl derivatives of $\Delta^5$-pregnene-3β,17α-diol-20-one (XIII).

Oxidation of these compounds with chromic acid in acetone solution followed by treatment with acid produces the $\Delta^4$-3-keto grouping, thus giving rise to the 16α-halomethyl derivatives of 17α-hydroxy-progesterone (XIV; $R^1$=H). Upon esterification of these compounds with acid anhydrides of less than 12 carbon atoms in benzene solution and in the presence of p-toluenesulfonic acid, there are produced the corresponding 17α-acyloxy compounds (XIV; $R^1$=acyl).

Thus for example, when the above process is applied to 16α-chloromethyl-$\Delta^5$-pregnen-3β-ol-20-one, there are produced successively 16α-chloromethyl-$\Delta^{5,17(20)}$-pregnadiene-3β-20-diol diacetate, 16α-chloromethyl-$\Delta^{5,17(20)}$-pregnadiene-3β,20-diol diacetate, 16α-chloromethyl-5α,6α;17α,20α-bisoxido-pregnane-3β,20-diol-diacetate, 16α-chloromethyl-5α,6α-oxido - pregnane-3β,17α-diol-20-one, 16α-chloromethyl-$\Delta^5$-pregnene-3β,17α-diol-20-one, 16α-chloromethyl-17α-hydroxy-progesterone and 17α-acyloxy-progesterone.

When 16α-chloromethyl, 16α-bromomethyl and 16α-iodomethyl-$\Delta^5$-pregnene-3β,17α-diol-20-one (XIII) are refluxed with phosphorous pentachloride or phosphorous pentabromide in benzene solution, there are produced the 3β-chloro- and 3β-bromo compounds (XV; $R^1$=H), which may be further esterified by the method previously described, thus affording the 17-acyloxy derivatives thereof (XV; $R^1$=acyl).

The 3β-fluoro-17α-hydroxy compounds are obtained from the 3-tosylates of 16α-halomethyl-$\Delta^5$-pregnene-3β,17α-diol-20-ones (XVI) which are converted into the 3,5-cyclo-6β-methoxy derivatives (XVII) by reaction with sodium acetate in methanol. Upon treatment with hydrofluoric acid, using the methods hereinbefore described for the compounds lacking the 17α-hydroxy group, there are produced 3β-fluoro-16α-chloromethyl-$\Delta^5$-pregnen-17α-ol-20-one, 3β-fluoro-16α-bromomethyl-$\Delta^5$-pregnen-17α-ol-20-one and 3β-fluoro-16α-iodomethyl-$\Delta^5$-pregnen-17α-ol-20-one (XVIII; $R^1$=H). By reaction of these compounds with acid anhydrides in benzene solution and in the presence of p-toluenesulfonic acid, there are produced the corresponding 17α-acyloxy compounds (XVIII; $R^1$=acyl).

By reaction of the tosylates (XVI) with lithium chloride in dimethylacetamide, using the method previously described for the 17α-unsubstituted compounds, there are produced the 16α-halomethyl-$\Delta^{3,5}$-pregnadien-17α-ol-20-one compounds (XIX; $R^1$=H) which are converted into the respective esters by the esterification method hereinbefore described.

The following examples serve to illustrate but are not intended to limit the scope of the present invention:

PREPARATION I

To a stirred suspension of 30.5 g. of 16α,17α-(4'-3c-pyrazolo)-$\Delta^5$-pregnen-3β-ol-20-one acetate in 160 cc. of anhydrous acetone there was added dropwise over a 15 minutes period 15 cc. of freshly distilled boron trifluoride etherate. All the precipitate went to solution and evolution of gas was observed. After a few minutes a new precipitate appeared, and the mixture was stirred for 30 minutes further. Water was then added and the solid filtered and washed well with water. After crystallization from methylene-chloride-methanol there were obtained 19 g. of 16α,17α-cyclomethylene-$\Delta^5$-pregnen-3β-ol-20-one acetate; M.P. 192–194° C., $[\alpha]_D$+33° (CHCl$_3$) identical to an authentic sample.

The foregoing compound was saponified in a conventional manner, by refluxing 1 hour with 3% methanolic potassium hydroxide, to give 16α,17α - cyclomethylene-$\Delta^5$ - pregnen - 3β - ol - 20 - one; M.P. 220–222; $[\alpha]_D$+76° (CHCl$_3$).

Example I

A solution of 1 g. of 16α,17α-cyclomethylene-$\Delta^5$-pregnen-3β-ol-20-one in 50 cc. of tetrahydrofuran was treated at 0–5° C. with 2 cc. of freshly distilled boron trifluoride ether complex and 5 cc. of concentrated hydrochloric acid. The mixture was stirred for 10 minutes at said temperature and then kept at room temperature, in the dark, for 4 days. The solution was then poured into ice water and the product extracted with ethyl acetate the extract was washed with water, 5% sodium bicarbonate solution and water to neutral, dried over anhydrous sodium sulfate and evaporated to dryness. The resulting yellow oil was dissolved in benzene and filtered through 10 g. of neutral alumina. The first 100 cc. of elution gave the pure 16α - chloromethyl - $\Delta^5$ - pregnen-3β-ol-20-one (recrystallized from acetone-hexane), which shows: M.P. 186–188° C. $[\alpha]_D$+22° (CHCl$_3$).

Example II 2 cc. of freshly distilled boron trifluoride etherate was added to a solution of 16α,17α-cyclomethylene-$\Delta^5$-pregnen-3β-ol-20-one previously cooled to 0° C. While stirring the mixture was treated dropwise, over a 15 minutes period with 15 cc. of 47% hydriodic acid. The solution which developed an intense red color, was kept at room temperature for 36 hours in the dark. It was then poured into water and extracted with ethyl acetate. The organic extract was washed with water, 5% sodium bicarbonate solution, sodium thiosulfate solution and water, dried over anhydrous sodium sulfate and evaporated to dryness.

The residue was chromatographed over fluorisil. The fractions eluted with benzene gave 530 mg. of 16α-iodomethyl - $\Delta^5$ - pregnen - 3β - ol-20-one; M.P. 148–150° C.; $[\alpha]_D$+17° (CHCl$_3$).

Example III

In the method of the preceding example there was used an aqueous saturated solution of hydrobromic acid instead of hydriodic acid. There was thus obtained 16α-bromomethyl-$\Delta^5$-pregnen-3β-ol-20-one.

Example IV

To a solution of 5 g. of 16α,17α-cyclomethylene-$\Delta^5$-pregnen-3β-ol-20-one in 100 cc. of anhydrous benzene were added 5 g. of phosphorus pentachloride and the resulting mixture was refluxed for 1 hour in the absence of moisture. It was then cooled, poured into water; the benzene layer was washed with water several times, dried over anhydrous sodium sulfate and evaporated to dryness. Crystallization of the residue from acetone gave 3β - chloro - 16α,17α - cyclomethylene-$\Delta^5$-pregnen-20-one M.P. 195–196° C. $[\alpha]_D$+56° (CHCl$_3$).

Upon treatment of the above compound with boron trifluoride and hydrochloric acid in tetrahydrofuran solution, in accordance with the method of Example I, there was produced 3β-chloro-16α-chloromethyl-$\Delta^5$-pregnen-20-one, M.P. 110–112° C. $[\alpha]_D$+18° (CHCl$_3$).

Example V

The preceding example was repeated but using phosphorus pentabromide instead of phosphorus pentachloride in the first step, thus obtaining 3β-bromo-16α,17α-cyclomethylene-$\Delta^5$-pregnen-20-one and 3$\beta$-bromo-16$\alpha$-chloromethyl-$\Delta^5$-pregnen-20-one.

*Example VI*

A solution of 1.7 g. of 16$\alpha$,17$\alpha$-cyclomethylene-$\Delta^5$-pregnen-3$\beta$-ol-20-one, in 100 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which was used for the next step without further purification.

The above crude compound was then treated with boron trifluoride and hydrochloric acid in tetrahydrofuran by following the method of Example I. The resulting oil was chromatographed on neutral alumina. The fractions eluted with hexane-benzene (6:4) gave the pure 16$\alpha$-chloromethyl-$\Delta^4$-pregnen-3,20-dione, M.P. 128–131° C.; $[\alpha]_D$+177° (CHCl$_3$).

In a similar manner but using 47% hydriodic acid and a saturated aqueous solution of hydrogen bromide instead of hydrochloric acid, in accordance with the methods of Examples II and III, there were produced respectively 16$\alpha$-iodomethyl-progesterone and 16$\alpha$-bromomethyl-progesterone.

*Example VII*

A solution of 5 g. of 16$\alpha$,17$\alpha$-cyclomethylene-$\Delta^5$-pregnen-3$\beta$-ol-20-one in 40 cc. of pyridine was treated with 5 g. of tosyl chloride and the mixture kept at 0° C. overnight. It was then poured into water and the formed precipitate collected by filtration. Crystallization from acetone-hexane gave the pure 16$\alpha$,17$\alpha$-cyclomethylene-$\Delta^5$-pregnen-3$\beta$-ol-20-one tosylate, M.P. 158–160° C. $[\alpha]_D$+23° (CHCl$_3$) $\lambda_{max}$ 224, 259, 273 m$\mu$ log $\epsilon$ 4.06, 2.70, 2.58.

A mixture of 4 g. of the above tosylate, 6 g. of potassium acetate, and 200 cc. of anhydrous methanol was refluxed for 6 hours. Then it was diluted with water and extracted with ethyl acetate. The organic extract was washed with water, dried over anhydrous sodium sulfate and evaporated to dryness. The residue was dissolved in hexane, the insoluble material was filtered off and the hexane solution filtered through a column of 100 g. of neutral alumina, thus giving the pure 16$\alpha$,17$\alpha$-cyclomethylene-3,5-cyclo-6$\beta$-methoxy-pregnan-20-one, M.P. 88–91° C. $[\alpha]_D$+125° (CHCl$_3$).

A solution of 2 g. of the latter compound in 100 cc. of thiophene free benzene was treated at 0° C. with 40 cc. of 40% aqueous hydrofluoric acid. The reaction mixture was kept for 20 hours at room temperature and then carefully poured into saturated sodium carbonate solution. The benzene layer was separated and the aqueous layer extracted several times with benzene. The combined benzene extract was washed to neutral, dried over anhydrous sodium sulfate and evaporated to dryness. The residue was chromatographed on 80 g. of neutral alumina. The fractions eluted with hexane-benzene 7:3 afforded 1 g. of 16$\alpha$,17$\alpha$-cyclomethylene-3$\beta$-fluoro-$\Delta^5$-pregnen-20-one, M.P. 160–162° C. $[\alpha]_D$+39° (CHCl$_3$).

Treatment of the foregoing compound with boron trifluoride-hydrochloric acid in tetrahydrofuran in accordance with the method of Example I, afforded 3$\beta$-fluoro-16$\alpha$-chloromethyl-$\Delta^5$-pregnen-20-one, M.P. 99–101° C. $[\alpha]_D$+11° (CHCl$^3$).

*Example VIII*

To a solution of 1.5 g. of the tosylate of 16$\alpha$,17$\alpha$-cyclomethylene-$\Delta^5$-pregnen-3$\beta$-ol-20-one in 25 cc. of dimethyl acetamide there was added 1.5 g. of lithium chloride and the mixture refluxed for 5 hours under anhydrous conditions. It was then concentrated to a small volume under vacuum, sodium chloride solution was added and the product extracted with ethyl acetate; the organic extract was washed to neutral, dried and evaporated. Chromatography of the residue on neutral alumina gave 16$\alpha$,17$\alpha$-cyclomethylene-$\Delta^{3,5}$-pregnadien-20-one in pure form; M.P. 91–93° C.; $[\alpha]_D$—72° (CHCl$_3$) $\lambda_{max}$ 228, 234, 243 m$\mu$ log $\epsilon$ 4.27, 4.28, 4.10.

Hydrochloric acid and boron trifluoride treatment of the preceding diene, in accordance with the method of Example I gave 16$\alpha$-chloro-methyl-$\Delta^{3,5}$-pregnadien-20-one, M.P. 80–82° C.; $[\alpha]_D$—31° (CHCl$_3$) $\lambda_{max}$ 228, 235, 242 m$\mu$ log $\epsilon$ 4.24, 4.25, 4.09.

*Example IX*

Examples II and III were repeated but using 3$\beta$-fluoro-16$\alpha$,17$\alpha$-cyclomethylene-$\Delta^5$-pregnen-20-one as starting material. There were thus obtained 3$\beta$-fluoro-16$\alpha$-iodomethyl-$\Delta^5$-pregnen-20-one and 3$\beta$-fluoro-16$\alpha$-bromomethyl-$\Delta^5$-pregnen-20-one.

*Example X*

A mixture of 6.6 g. of 16$\alpha$-chloromethyl-$\Delta^5$-pregnen-3$\beta$-ol-20-one, 2.7 g. of p-toluenesulfonic acid and 300 cc. of acetic anhydride was submitted to a slow distillation during 5 hours. The residue was cooled and poured into iced water. The product was then extracted with ether, the extract washed successively with an aqueous solution of sodium carbonate and water to neutral, dried and evaporated to dryness. The residue consisted of 16$\alpha$-chloromethyl-$\Delta^{5,17(20)}$-pregnadien-3$\beta$,20-diol-diacetate which was utilized in the following step without purification.

The above crude compound was dissolved in 100 cc. of benzene and treated with a solution of perbenzoic acid in benzene (2.1 molar equivalents), at 0° C., for 20 hours. Water was then added, the organic layer separated, washed with an aqueous solution of sodium bicarbonate, then with water, dried with anhydrous sodium sulfate and evaporated to dryness. The residue consisted of the crude 16$\alpha$-chloromethyl-5$\alpha$,6$\alpha$;17$\alpha$,20$\alpha$-bis-oxido-pregnan-3$\beta$,20-diol-diacetate.

This crude oxido compound was treated with 500 cc. of a 2% methanolic solution of potassium hydroxide at room temperature for 1 hour, the mixture was neutralized by addition of acetic acid, concentrated to small volume under reduced pressure, the product was precipitated by addition of ice water, filtered off, washed with water, dried and evaporated to dryness. The oily residue was dissolved in 80 cc. of glacial acetic acid, there was added a mixture of 6 g. of sodium iodide, 1.6 g. of sodium acetate, 320 mg. of zinc and 2 drops of water. While cooling in an ice bath and stirring, there were added to the resulting mixture, 800 mg. of zinc dust in small portions. The stirring was continued for 6 hours and the temperature allowed to attain 25° C.

The reaction mixture was filtered and the filtrate diluted with ice water, alkalized with sodium bicarbonate and extracted with ethyl acetate. The extract was washed to neutral, dried over anhydrous sodium sulfate and evaporated to dryness. The residue was then chromatographed on 250 g. of neutral alumina, to give the pure 16$\alpha$-chloromethyl-$\Delta^5$-pregnene-3$\beta$,17$\alpha$-diol-20-one.

*Example XI*

A solution of 1 g. of 16$\alpha$-chloromethyl-$\Delta^5$-pregnene-3$\beta$,17$\alpha$-diol-20-one in 10 cc. of acetone was cooled to 0° C. and treated under an atmosphere of nitrogen and with stirring, with a solution of 8 N chromic acid in accordance with the method of Example VI until the color of the reagent persisted in the mixture. It was stirred for 5 minutes futher at 0–5° C. and diluted with water. The product was extracted with methylene chloride and the organic extract washed with water to neutral, dried over anhydrous sodium sulfate and evaporated to dryness. The residue was dissolved in 20 cc. of methanol 0.5 cc. of concentrated hydrochloric acid was added and the mixture kept at 10° overnight. Water was added and the formed precipitate collected by filtration, washed to neutral and dried. Recrystallization from acetone-hexane gave the pure 16α-chloromethyl-17α-hydroxy-progesterone.

*Example XII*

By following the methods of Examples X and XI 16α-bromomethyl-Δ⁵-pregnen-3β-ol-20-one was converted into 16α - bromomethyl - Δ⁵ - pregnene - 3β,17α - diol-20-one and 16α-bromomethyl-17α-hydroxy-progesterone.

Isolation of the product by methylene chloride extraction and crystallization of the residue from acetone-ether gave 3β-chloro-16α-bromomethyl-Δ⁵-pregnene-17α-ol-20-one acetate.

*Example XVIII*

By following the esterification method of Example XIII, the following compounds were converted into their corresponding esters, in accordance with the anhydride used as reagent.

| Starting Material | Acylating Agent | Final Compound |
|---|---|---|
| 16α-chloromethyl-3β-fluoro-Δ⁵-pregnen-17α-ol-20-one | Propionicanhydride | Propionate of 16α-chloromethyl-3β-fluoro-Δ⁵-pregnen-17α-ol-20-one. |
| 16α-chloromethyl-Δ³,⁵-pregnadien-17α-ol-20-one | Caproicanhydride | Caproate of 16α-chloromethyl-Δ³,⁵-pregnadien-17α-ol-20-one. |
| 16α-bromomethyl-17α-hydroxy-progesterone | Aceticanhydride | Acetate of 16α-bromomethyl-17α-hydroxy-progesterone. |
| 16α-chloromethyl-3β-chloro-Δ⁵-pregnen-17α-ol-20-one | Caproicanhydride | Caproate of 16α-chloromethyl-3β-chloro-Δ⁵-pregnen-17α-ol-20-one. |

*Example XIII*

To a solution of 500 mg. of 16α-chloromethyl-17α-hydroxy-progesterone in 10 cc. of anhydrous benzene there were added 0.1 g. of p-toluenesulfonic acid and 1 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 16α-chloromethyl-17α-acetoxy-progesterone.

In a similar manner but using caproic, propionic and cyclopentylpropionic anhydrides as esterifying agents, there were produced the caproate, propionate and cyclopentylpropionate of 16α - chloromethyl - 17α - hydroxy-progesterone.

*Example XIV*

A solution of 1 g. of 16α-chloromethyl-Δ⁵-pregnene-3β,17α-diol-20-one, (obtained as described in Example X) in 30 cc. of benzene was treated with phosphorus pentachloride in accordance with the method of Example IV, to afford 3β-chloro-16α-chloromethyl-Δ⁵-pregnen-17α-ol-20-one.

Upon esterification of the latter compound with acetic anhydride in benzene solution and in the presence of p-toluenesulfonic acid, by following the method of the preceding example, there was obtained the acetate of 3β-chloro-16α-chloromethyl-Δ⁵-pregnen-17α-ol-20-one.

*Example XV*

2 g. of 16α - chloromethyl-Δ⁵-pregnene-3β,17α-diol-20-one was submitted to the reactions described in Example VII to produce successively 16α-chloromethyl-Δ⁵-pregnene-3β,17α-diol-20-one 3-monotosylate, 16α-chloromethyl-Δ³,⁵-cyclo - 6 - methoxy-pregnan-17α-ol-20-one, and 3β-fluoro-16α-chloromethyl-Δ⁵-pregnen-17α-ol-20-one.

*Example XVI*

1 g. of 16α-chloromethyl-Δ⁵-pregnene-3β-17α-diol-20-one 3-monotosylate was treated with lithium chloride in dimethyl acetamide, by following the method of Example VIII, to produce 16α-chloromethyl-Δ³,⁵-pregnadien-17α-ol-20-one.

*Example XVII*

1 g. of 16α-bromomethyl-Δ⁵-pregnene-3β,17α-diol-20-one was converted into 3β-chloro-16α-bromomethyl-Δ⁵-pregnen-17α-ol-20-one, by treatment with phosphorus pentachloride in benzene solution in accordance with the method of Example IV.

A mixture of 500 mg. of the latter compound, 500 mg. of p-toluenesulfonic acid monohydrate, 20 cc. of acetic acid and 10 cc. of acetic anhydride was kept for 24 hours at room temperature. It was then poured into water and stirred until the excess of anhydride had hydrolyzed.

We claim:
1. A compound of the following formula:

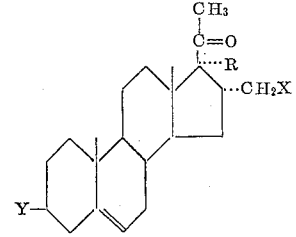

wherein X is selected from the group consisting of chlorine, bromine and iodine; Y is selected from the group consisting of fluorine, chlorine and bromine; and R is selected from the group consisting of hydrogen, hydroxy and an hydrocarbon carboxylic acyloxy group of less than 12 carbon atoms.

2. 3β-chloro-16α-chloromethyl-Δ⁵-pregnene-20-one.
3. 3β-bromo-16α-chloromethyl-Δ⁵-pregnene-20-one.
4. 3β-fluoro-16α-chloromethyl-Δ⁵-pregnene-20-one.
5. 3β-chloro-16α-chloromethyl-Δ⁵-pregnen - 17α - ol-20-one.
6. 3β-chloro-16α-bromomethyl-Δ⁵-pregnen - 17α - ol-20-one.
7. 3β-fluoro - 16α - chloromethyl-Δ⁵-pregnen - 17α - ol-20-one.
8. The acetate of 3β-chloro-16α-chloromethyl-Δ⁵-pregnen-17α-ol-20-one.
9. A compound of the following formula:

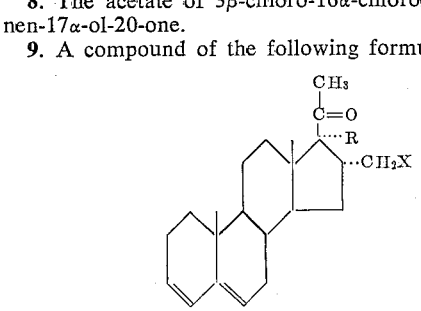

wherein X is selected from the group consisting of chlorine, bromine and iodine; and R is selected from the group consisting of hydrogen, hydroxy and an hydrocarbon carboxylic acyloxy group of less than 12 carbon atoms.

10. 16α-chloromethyl-Δ³,⁵-pregnadien-20-one.
11. 16α-chloromethyl-Δ³,⁵-pregnadien-17α-ol-20-one.
12. The caproate of 16α-chloromethyl-Δ³,⁵-pregnadien-17α-ol-20-one.

References Cited by the Examiner
UNITED STATES PATENTS
3,232,961  2/1966  Kaspar et al. _____ 260—397.3

LEWIS GOTTS, *Primary Examiner.*

H. F. FRENCH, *Assistant Examiner.*